United States Patent [19]

Shigematsu et al.

[11] Patent Number: 5,509,098
[45] Date of Patent: Apr. 16, 1996

[54] OPTICAL TRANSMISSION LINE AND A METHOD OF FORMING THEREOF

[75] Inventors: Masayuki Shigematsu; Masayuki Nishimura, both of Yokohama, Japan

[73] Assignee: Sumitomo Electric Industries, Ltd., Osaka, Japan

[21] Appl. No.: 153,055

[22] Filed: Nov. 17, 1993

[30] Foreign Application Priority Data

Nov. 17, 1992 [JP] Japan .................. 4-307151

[51] Int. Cl.$^6$ .............. G02B 6/16; H04B 3/52
[52] U.S. Cl. .......... 385/123; 359/173; 359/179; 359/195; 385/1; 385/24
[58] Field of Search .................. 385/1–3, 11, 14, 385/15, 24, 27, 39, 50, 123; 359/154, 156, 161, 173, 174, 179, 188, 195, 341

[56] References Cited

U.S. PATENT DOCUMENTS

| | | | |
|---|---|---|---|
| 5,327,511 | 7/1994 | Heismann et al. | 385/1 |
| 5,345,331 | 9/1994 | Bergano et al. | 359/341 |
| 5,386,484 | 1/1995 | Ooka et al. | 385/11 |

OTHER PUBLICATIONS

Poole et al, "Broadband Dispersion Compensation by Using the Higher–Order Spatial Mode in a Two–Mode Fiber", Optics Letters, vol. 17, No. 14, Jul. 15, 1992, pp. 985–987.

Gisin et al, "Experimental comparision Between Two Different Methods for Measuring Polarisation Mode Dispersion in Singlemode Fibres", Electronics Letters, vol. 27, No. 24, Nov. 21, 1991, pp. 2292–2294.

Poole et al, "Polarization–Dependent Pulse Compression and Broadening Due to Polarization Dispersion in Dispersion–Shifted Fiber", Optics Letters, vol. 13, No. 2, Feb. 1988, pp. 155–157.

*Primary Examiner*—John D. Lee
*Attorney, Agent, or Firm*—Cushman Darby & Cushman

[57] ABSTRACT

In this invention, an optical analog signal obtained such that light having a wavelength $\lambda 1$ is intensity-modulated or frequency-modulated with a modulation index m per channel and a chirping amount $\lambda s$ for 100% modulation is transmitted. An optical element connected to an outlet of a transmission medium having a polarization mode dispersion $\tau$ with respect to an optical signal is selected such that when the optical signal output from the optical element requires a predetermined composite second-order distortion C, a transmittance $T_0$ of the optical element for the light having the wavelength $\lambda 1$ and a polarization dependency A of an insertion loss satisfy the following condition:

$$20 \log_{10}\{(2\pi c/\lambda 1^2) \cdot n \cdot (A/T_0) \cdot \tau \cdot m \cdot \lambda s\} \leq C$$

(where n is a number of beats occurring in the optical signal and c is the light velocity).

17 Claims, 6 Drawing Sheets

Phase difference 0

Phase difference $\pi/4$

Phase difference $\pi/2$

Phase difference $3\pi/4$

Phase difference $\pi$

Phase difference $5\pi/4$

Phase difference $3\pi/2$

Phase difference $7\pi/4$ (Polarization dependent less)

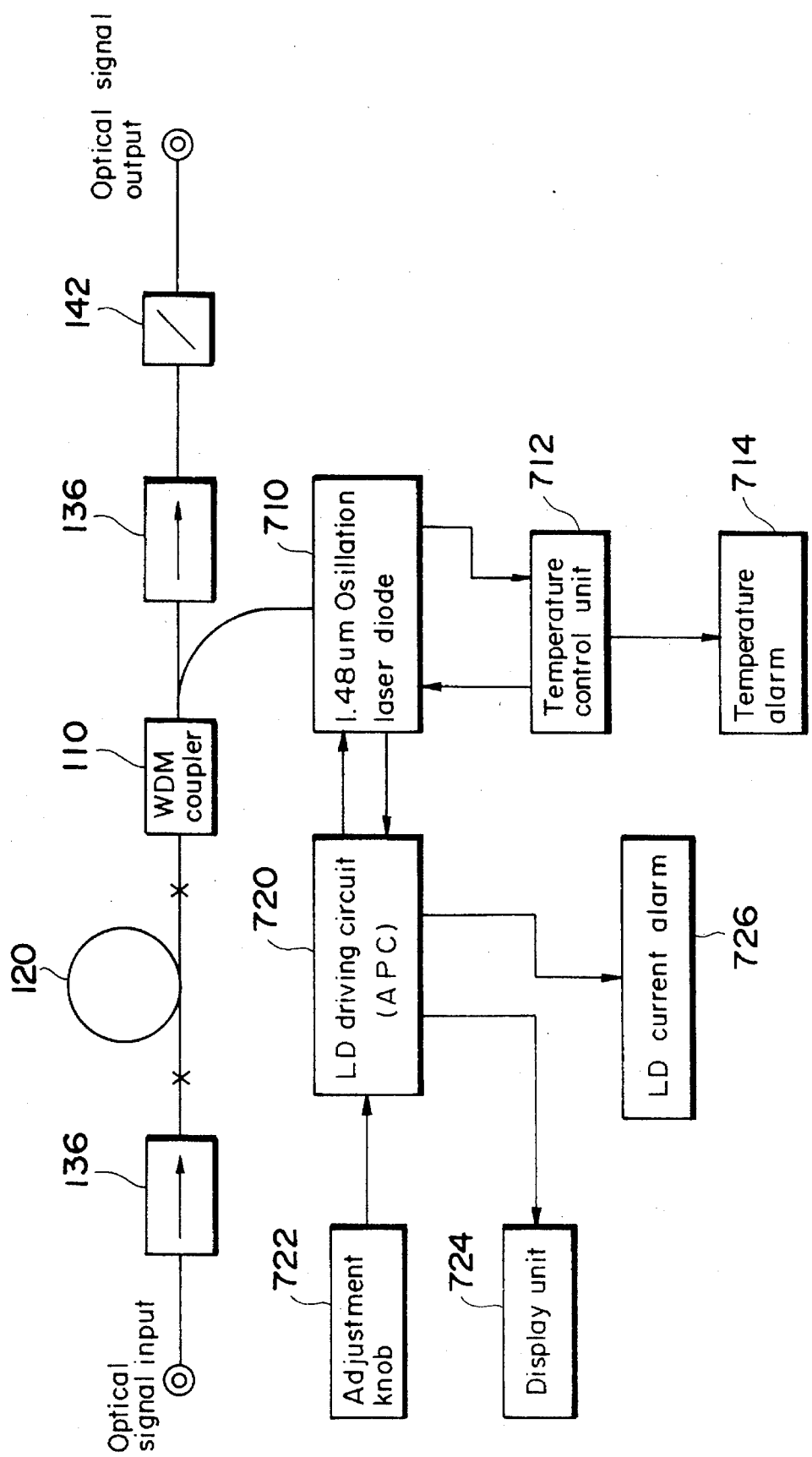

OPTICAL TRANSMISSION LINE AND A METHOD OF FORMING THEREOF

BACKGROUND OF THE INVENTION

The present invention relates to a composite second-order intermodulation (to be referred to as a distortion factor hereinafter) reduction technique in an optical communication transmission line (including an optical repeating amplifier).

Optical fiber communications have been used in the field of public communications, traffic systems, and private communication networks of power systems, and are expected to become important techniques in future societies highly oriented with information. The optical fiber communications have advantages in low losses, wide bands, lightweight, non-induction, and energy savings over communications using metallic cables. Low-cost, high-reliability communication systems, and construction and maintenance of these communication systems can be facilitated. Optical fibers are classified into a single mode fiber and a multimode fiber. The single mode fiber is better in loss and band characteristics than the multimode fiber and is expected to be popular.

An optical fiber communication system employs a direct intensity modulation scheme. This transmission scheme includes a digital transmission scheme and an analog transmission scheme. A digital transmission scheme is generally used in a communication network. In an analog transmission scheme, a light source is directly intensity-modulated or frequency modulated using an frequency division multiplexing input signal. on a receiving side, the light is converted into an electrical signal, and the electrical signal is amplified. The amplified signal is then filtered through a band-pass filter, thereby easily performing signal transmission. The analog transmission scheme is assumed to be suitable in private branch transmission, subscriber trunk transmission, and video transmission.

The present inventor performed analog transmission for optical amplification using an Er-doped optical fiber. In this case, the present inventor found that the distortion factor was increased using an optical fiber having a large polarization mode dispersion (PMD). In the analog transmission scheme, mode distribution noise is predominant in the multimode fiber, while reflected noise is predominant in the single mode fiber (Hikari Tsushin Handbook). The increase in distortion factor was not based on either noise, but was based on the polarization mode dispersion according to the finding of the present inventor.

Of all the transmission characteristics of optical fibers, band characteristics are determined by the dispersion (difference in transmission speed). If the core of a single mode fiber is truly circular, the transmission mode is degenerated, and band characteristics determined by wavelength dispersion are obtained. However, in practice, the core cannot be truly circular, degeneracy is canceled, and the transmission speed changes on a polarization plane (C. D. Poole, *Optics Letters*, Vol. 14, No. 10, pp. 523–525), thereby increasing the distortion factor. To solve the problem on the increase in distortion factor is to improve the transmission quality in the analog transmission scheme and to improve the band characteristics, thereby improving the digital transmission scheme. Along with highly advanced future optical communication techniques, it is possible to further improve communication systems.

SUMMARY OF THE INVENTION

It is an object of the present invention to provide a means for suppressing the above-mentioned increase in distortion factor.

It is further an object of the present invention to provide a method of forming an optical transmission line comprising a first transmission medium, a second transmission medium and a third transmission medium, for transmitting an intensity-modulated optical signal, in which an optical signal is transmitted from said first optical medium to said second medium and is transmitted to said third transmission medium;

an optical signal input into said first transmission medium has a $\lambda 1$ wavelength, a modulation index m per channel and a chirping amount $\lambda s$ for 100% modulation, and a number n of beats and;

an optical signal output from said optical second transmission medium has a predetermined composite second-order distortion (CSO) C [dB], comprising the steps of:

selecting said transmission medium having a characteristics satisfying the following equation:

$$20 \log_{10}\{(2\pi c/\lambda 1^2) \cdot n \cdot (A/T_0) \cdot \tau \cdot m \cdot \lambda s\} \leq C$$

(wherein said first transmission medium has polarization mode dispersion $\tau$ with respect to an inputted optical signal, a transmittance and a polarization dependency of an insertion loss of said second transmission medium optical signal are respectively $T_O$ and A, and c is the light velocity); and inserting said second transmission medium selected by said selecting step between said first and third transmission media.

It is further an object of the present invention to provide an optical transmission line for transmitting an intensity-modulated optical signal, comprising:

a first transmission medium having polarization mode dispersion $\tau$ with respect to said optical signal a second transmission medium connected to an outlet of said first transmission medium; and a third transmission medium connected to an output of said second transmission medium, for transmitting the optical signal output, wherein the optical signal in said second transmission medium has a predetermined composite second-order distortion C [dB], and a transmittance T0 of said optical element for said optical signal and a polarization dependency A of an insertion loss satisfy the following condition:

$$20 \log_{10}\{(2\pi c/\lambda 1^2) \cdot n \cdot (A/T_0) \cdot \tau m \cdot \lambda s\} \leq C$$

(where $\lambda 1$ is a wavelength of said optical signal, m is a modulation index per channel of said optical signal at said first transmission media, $\lambda s$ is a chirping amount for 100% modulation of said optical signal at said first transmission media, n is a number of beats occurring in the optical signal and c is the light velocity).

It is further an object of the present invention to provide an optical communication apparatus for propagating an intensity-modulated optical signal, comprising:

transmission media having a polarization mode dispersion $\tau$ for said optical signal and a receiver connected to an outlet of said transmission medium for receiving and converting said optical signal to electric signal, wherein said electrical signal from said optical receiver has a predetermined composite second-order distortion C [dB], and, said optical receiver comprises an optical receiver defined such that a conversion efficiency η0 of said optical receiver for the light having the wavelength λ1 and a polarization dependency B of the conversion efficiency η0 satisfy the following condition:

$$20 \log_{10}\{(2\pi c/\lambda 1^2)\cdot n\cdot (B/\eta_0)\tau\cdot m\cdot \lambda s\} \leq C$$

(where λ1 is a wavelength of said optical signal, m is a modulation index per channel of said optical signal, λs is a chirping amount for 100% modulation of said optical signal, n is a number of beats occurring in the optical signal and c is the light velocity).

With the above arrangement, the composite second-order distortion at the outlet of the optical element can be suppressed to be smaller than C [dB]. Therefore, an accidental increase in distortion factor can be suppressed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIG. 7 is a view showing still another arrangement; and

DETAILED DESCRIPTION OF THE PREFERRED EMBODIMENTS

Figure 1:
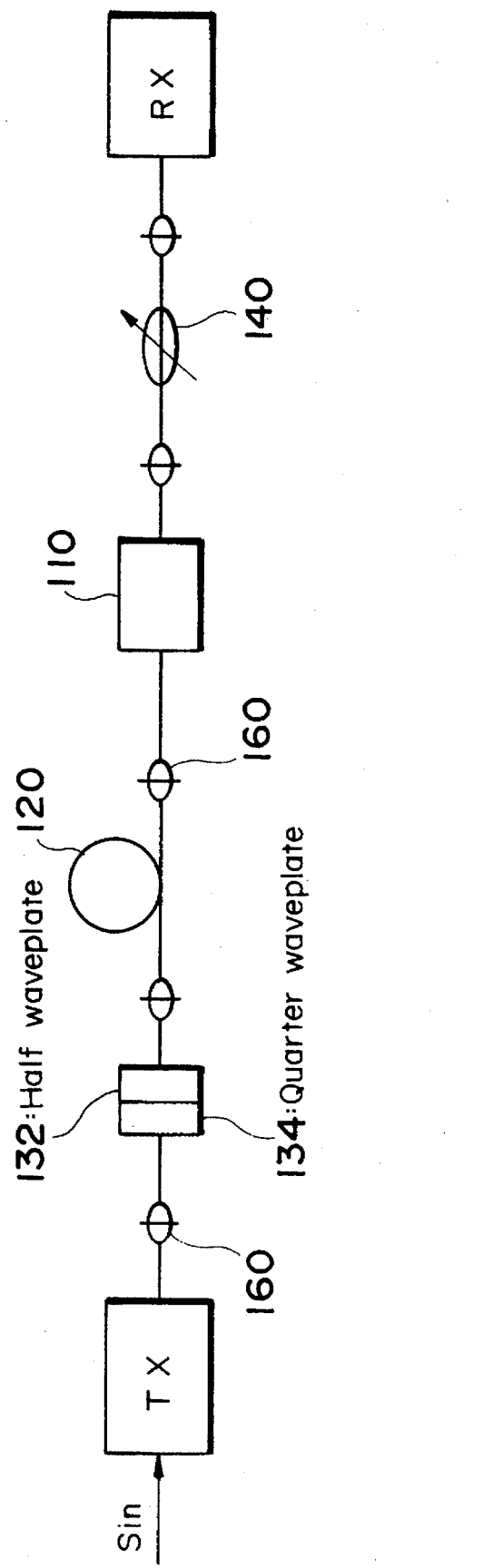
FIG. 1 is a view showing a basic arrangement.

Preferred embodiments of the present invention will be described with reference to the accompanying drawings. FIG. 1 shows a simplest arrangement to which the present invention is applied according to an embodiment. This optical communication apparatus has an optical fiber 120 and an optical element 110 which serve as a transmission line between a transmitter TX and a receiver RX. The transmitter TX intensity-modulates a laser diode having a predetermined center wavelength ( angular frequency: $2\pi c/\lambda_1$ where c is the light velocity in a vacuum) in accordance with an input signal Sin and outputs the intensity-modulated signal as an optical signal. In this case, intensity modulation is performed with a modulation index m per channel and a chirping amount $\lambda_s$ for 100% modulation. The optical fiber 120 is connected to the optical element 110 with an optical connector 160 and supplies an optical signal from the transmitter TX to the optical element 110. The receiver RX converts the optical signal from the optical element 110 into an electrical signal and outputs this electrical signal. A λ/2 plate 132, a λ/4 plate 134, and an optical attenuator 140 are arranged to measure a distortion factor and can be omitted in practice, which will be described later. The optical element 110 has a polarization dependency A of an insertion loss and a transmittance $T_0$ which satisfy the following condition (1) for a required distortion factor C:

$$(2\pi c/\lambda_1^2)\cdot n\cdot (A/T_0)\cdot \tau\cdot m\cdot \lambda_s \leq C \qquad (1)$$

where τ is a polarization mode dispersion received by incident light and n is the number of produced beats.

The input signal Sin is converted into an optical signal by the transmitter TX and converted into an electrical signal by the receiver RX through the optical fiber 120 and the optical element 110, and this electrical signal is output. The optical signal having the polarization mode dispersion τ is supplied from the optical fiber 120 to the optical element 110. The output signal from the receiver RX has a distortion caused by the polarization dependency of the insertion loss of the optical element 110. In this case, the distortion factor of the output signal is smaller than the required distortion factor C because the optical signal 110 satisfies condition (1). That is, an increase in distortion factor is suppressed, and a distortion factor equal to or smaller than the required distortion factor can be obtained. For this reason, the distortion factor characteristics can be controlled to improve transmission quality, thereby performing good optical communication.

An increase in distortion factor may be caused by the optical element 110 due to the following reason.

Assume a polarization state at an exit end, i.e., a polarization state of light incident on the optical element 110 in the presence of a polarization mode dispersion (birefringence) as in the optical fiber. If the main axes of polarization are defined as X- and Y-axes, and linearly polarized light deviated from the axes is incident, axial electric fields $E_x$ and $E_y$ at the exit end are represented by the following equations as a function of time t.

$$E_x = A_x \exp(i(\omega t - kn_x)) \qquad (2)$$

$$E_y = A_y \exp(i(\omega t - kn_y)) \qquad (3)$$

for birefringence $B = n_x - n_y$ $\qquad (4)$ polarization mode dispersion $\tau = Bl/c$ $\qquad (5)$ where ω is the angular frequency of light, is the fiber length, $n_x$ and $n_y$ are refractive indices of a core for X-and Y-polarized components, k $(=(2\pi/\lambda))$ is the number of waves, c is the light velocity.

According to eq. (2) and (3), when a phase difference between the X- and Y-polarized components changes, it is expected to change the polarization state of exit light. A change in polarization state is maximum when the incident linearly polarized light is shifted from the main axis by 45°. FIGS. 2A to 2H show the polarization states of exit light components corresponding to the phase differences.

Figure 2A:
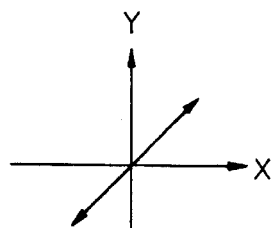
FIGS. 2A to 2H are graphs showing polarization states for light components incident on an optical element.
Figure 2B:
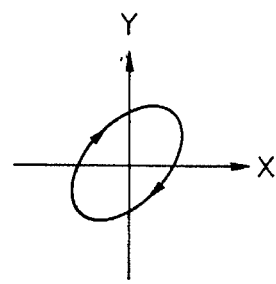
Figure 2C:
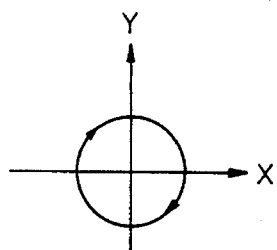
Figure 2D:
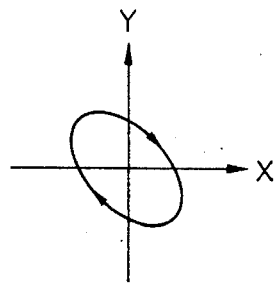
Figure 2E:
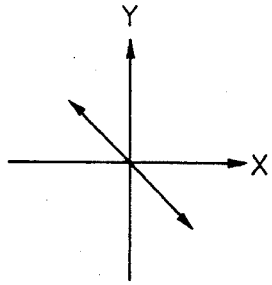
Figure 2F:
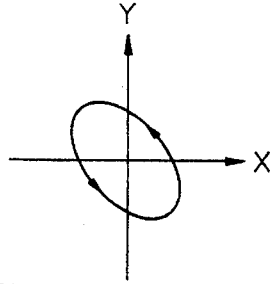
Figure 2G:
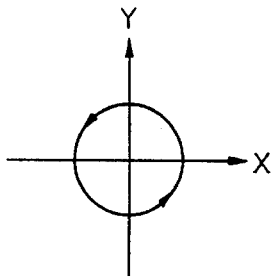
Figure 2H:
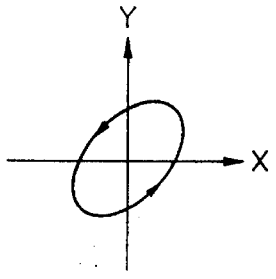

The phase difference is gradually increased in an order of 0 in FIG. 2A, π/4 in FIG. 2B, and π/2 in FIG. 2C. The polarization states of the exit light components are changed in the forms of a straight line, an ellipse, and a circle in the order named.

In practice, the phase difference between the X- and Y-polarized components is changed depending on wavelengths. When the wavelength is changed from a wavelength $\lambda_1$ to a wavelength $\lambda_2$, a phase difference $\Delta\Phi$ between the X- and Y-polarized components is changed to $k(n_{x1}-n_{y1})l - k(n_{x2}-n_{y2})l$ where $n_{x1}$ and $n_{x2}$ and $N_{y1}$ and $n_{y2}$ are given for the X- and Y-polarized component of the wavelengths $\lambda_1$ and $\lambda_2$. If the change $\Delta\lambda(=\lambda_1-\lambda_2)$ in wavelength is sufficiently small and a change in wavelength dependency of the birefringence B is as small as negligible, the phase difference $\Delta\Phi$ becomes $2\pi Bl(1/\lambda_1-1/\lambda_2)$. For example, if this phase difference $\Delta\Phi$ is $2\pi$ (rad), the change $\Delta\lambda$ in wavelengths of the X- and Y-polarized components becomes $\lambda_2^1/(Bl-\lambda_1)$. The value of equation (5) and $\tau c$ are very larger than $\lambda_1$, and the change $\Delta\lambda$ can be defined by the following equation.

$$\Delta\lambda=\lambda_1^2/\tau c \quad (6)$$

The transmittance $T(\lambda)$ obtained upon incidence of such exit light on the optical element 110 having the polarization dependency A ($\pm A\times 100\%$) of the transmittance has a wavelength dependency represented as follows because A is regarded to be constant in the range of $\Delta\lambda$:

$$T(\lambda)=(T_0-A)+2A\sin^2\{(\lambda-\lambda_1)\pi/\Delta\lambda\} \quad (7)$$

Figure 3:
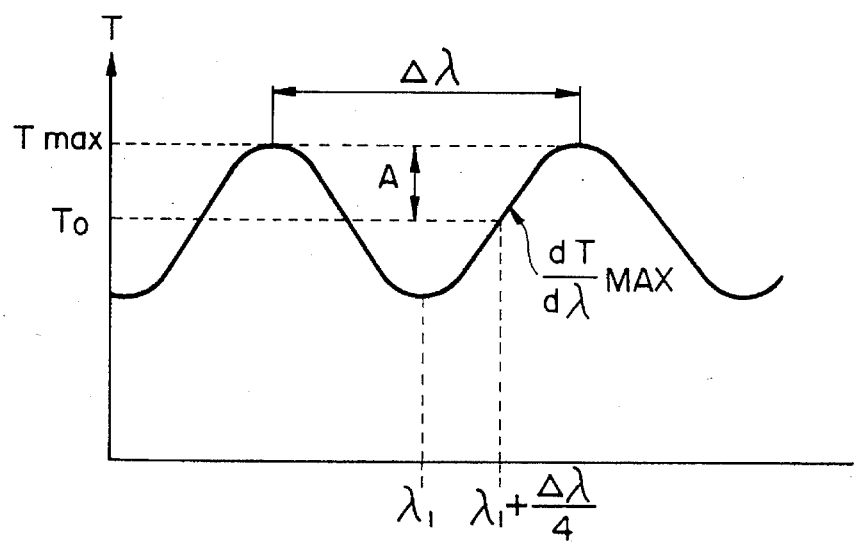
FIG. 3 is a graph showing a wavelength dependency of a transmittance.

FIG. 3 is a graph showing the relationship between the wavelength dependency $T(\lambda)$ and the wavelength $\lambda$.

The average transmittance is defined as $T_0$.

As the laser diode in the transmitter TX is directly intensity-modulated, the wavelength of the optical signal chips. As a result, the transmittance fluctuates and the optical signal is distorted as chirping. When a gradient $(dT/d\lambda)$ of the transmittance with respect to the wavelength is maximum, the distortion factor has a worst (maximum) value. The maximum value of $dT/d\lambda$ is calculated from equation (7) as $(2A\pi/\Delta\lambda)$.

If the transmittance has a wavelength dependency, the distortion factor C is generally represented as follows:

$$C[dB]=20\log_{10}(n\cdot m\cdot\lambda_s\cdot(dT/d\lambda)\cdot 1/T) \quad (8)$$

where n is the number of produced beats.

The maximum value Cmax of the distortion factor C can be obtained from the maximum value of $dT/d\lambda$ and the corresponding transmittance $T_0$:

$$C\max=20\log_{10}(n\cdot m\cdot\lambda_s\cdot(2A\pi/\Delta\lambda)\cdot 1/T_0) \quad (9)$$

When the change $\Delta\lambda$ in wavelengths of the X- and Y-polarized components is eliminated using equation (6), the maximum value Cmax is represented as follows:

$$C\max=20\log_{10}((2\pi c/\lambda_1^2)\cdot n\cdot(A/T_0)\cdot\tau\cdot m\cdot\lambda_s) \quad (10)$$

As can be apparent from the equation, the distortion factor of the optical signal transmitted through the optical element 110 is smaller than the maximum value Cmax. For this reason, if the optical element 110 satisfies equation (10) with respect to the required distortion factor, the distortion factor of the optical signal is always smaller than the required distortion factor.

The respective components of the apparatus are arranged as follows to measure the distortion factor.

The transmitter TX was a transmitter using an DFB-LD whose center wavelength $\lambda_1$ (angular frequency: $2\pi c/\lambda_1$; light velocity in a vacuum: c) was 1.552 μm. The input signal Sin was a 42ch AM-VSB signal (91.25 MHz to 337.25 MHz). The modulation index m per channel was 3.2%, and the chirping amount $\lambda_s$ for 100% modulation was $1.44\times 10^{-1}$ nm. The optical fiber 120 was a 30-m long polarization maintaining fiber (PM fiber). The polarization mode dispersion $\tau$ of the optical fiber was 15 ps at the wavelength $\lambda_0$ of 1.55 μm. The polarization mode dispersion to the optical element 110 is relatively large. An optical fiber coupler was used as the optical element, and samples having different polarization dependencies of insertion losses were prepared. The $A/T_0$ values of samples 1, 2, 3, and 4 were $2.8\times 10^{-3}$, $1.2\times 10^{-2}$, $16\times 10^{-2}$, and $1.1\times 10^{-1}$.

In this case, the maximum value Cmax can be expressed as follows.

$$C\max=20\log_{10}n-31.4+20\log_{10}(A/T_0) \quad (11)$$

Figure 4:
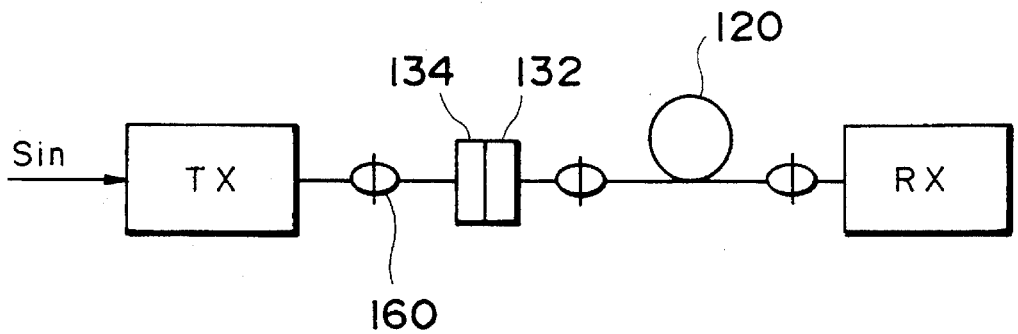
FIG. 4 is a view showing an arrangement for measuring the distortion factor of a receiver RX from a bare transmitter TX.

In measurement, the light-receiving power of the receiver RX is adjusted by the optical attenuator 140 to be −1.5 dBm. The $\lambda/2$ plate 132 and the $\lambda/4$ plate 134 are rotated to change the polarization angle of the optical signal from the transmitter TX to the optical fiber 120. A maximum value Cmax of the distortion factor at the carrier frequency of 91.25 MHz was measured. In addition, as shown in FIG. 4, the optical element 110 was omitted from the transmission line, and the distortion factor of the receiver RX was measured directly by the bare transmitter TX. The net distortion factor of the optical fiber 120 and the optical element 110 was calculated. Table 1 shows the measurement results of the distortion factors.

TABLE 1

|  | Sample 1 | Sample 2 | Sample 3 | Sample 4 |
| --- | --- | --- | --- | --- |
| Maximum Value | −52.2 | −45.9 | −44.9 | −32.7 |
| Net Distortion Factor | −61.6 | −49.2 | −47.8 | −33.3 |

The number n of beats is 19 within the bandwidth at the carrier frequency of 91.25 MHz. Equation (11) represents the maximum value obtained when the sum of beats is perfectly in phase with the difference between beats. It is not plausible to set a coefficient of 20 for the number n of beats. In practice, the coefficient for the number n of beats is set to 15 because it generally falls within the range of about 10 to 20. Therefore, the maximum value of the distortion factor can be represented as follows:

$$C\max=19.2-21.4+20\log_{10}(A/T_0) \quad (12)$$

Figure 5A:
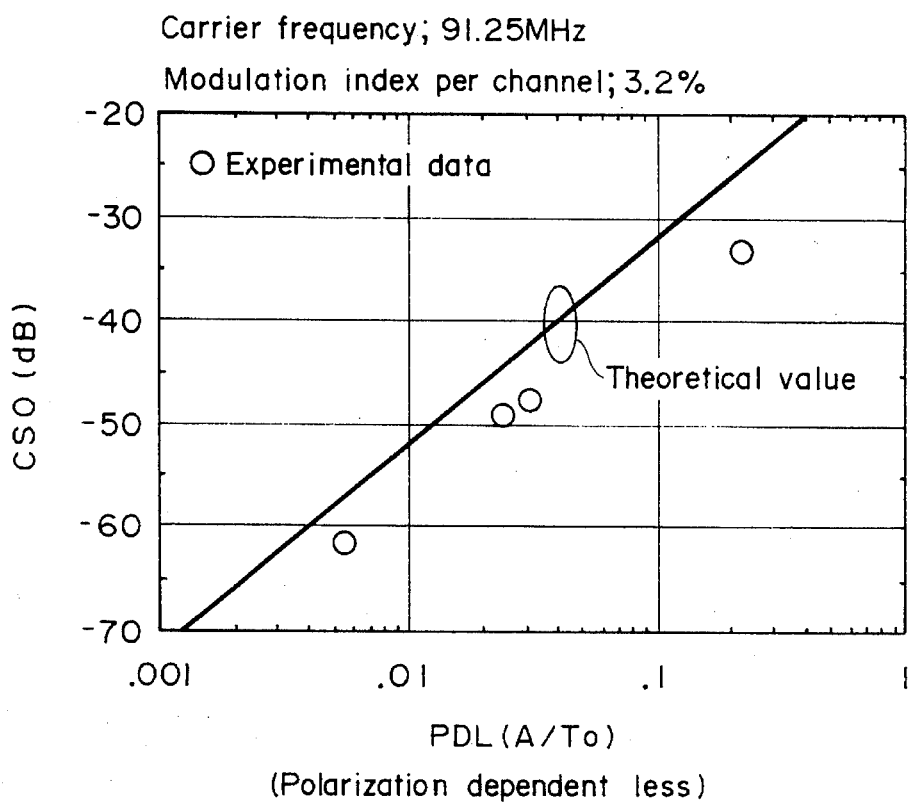
FIG. 5A is a graph showing results of Table 1 and values obtained by equation (12)

The plot in FIG. 5 exhibits the results in Table 1. A solid line represents values obtained by equation (12). If condition (1) is satisfied for the required distortion factor of the optical signal transmitted through, the distortion factor of the optical element 110 is proved to be always smaller than the required distortion factor.

Figure 5B:
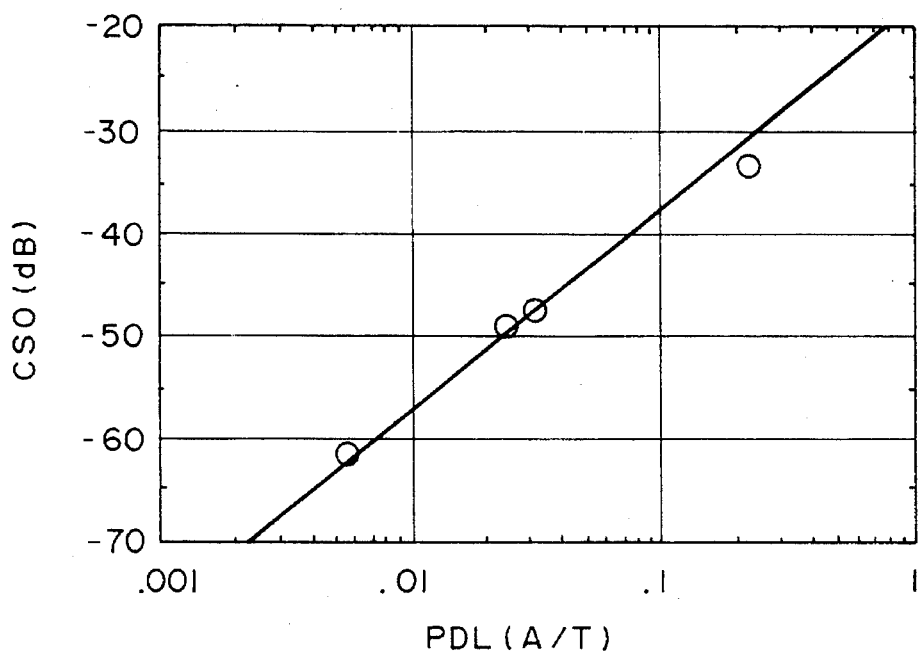
FIG. 5B is a graph in which a straight line is drawn to obtain an experimental equation for the results in Table 1.

FIG. 5B shows a fitted curve to the experimental data an experimental curve based on the results in Table 1. The gradient of the graph in FIG. 5B is almost equal to that of the graph in FIG. 5A. The graph in FIG. 5B is obtained by shifting the line in FIG. 5A to the right. The coefficient of 11 for the number n of beats is obtained by fitting the curve to the results in Table 1. If equation (11) is satisfied in the case that the coefficient for the number n of beats is 11, the measurement value of the distortion factor satisfies the required specifications.

In analog transmission using an optical fiber, a necessary distortion factor is described in "*Communication Engineering and Design*, May 1990, pp. 28–20". In this paper, values associated with a trunk line and a feeder line are represented. According to these values, a distortion factor (CSO) is required as −61 dB (line 3, paragraph 3, p. 30).

In practice, an optical transmission line must be arranged so that the optical element 110 is determined to satisfy the following condition from condition (1):

$$20 \log_{10}\{(2\pi c/\lambda_1^2)\cdot n\cdot (A/T_0)\cdot \tau\cdot m\lambda_s\} \leq -61 \qquad (13)$$

When the measurement values in Table 1 are used, an optical element which satisfies equation (13) satisfies the required specifications of the distortion factor. In this case, sample 1 satisfies the required distortion factor, judging from the $A/T_0$ values of samples 1 to 4. Samples 2, 3, and 4 cannot satisfy the required specifications.

The above embodiment has exemplified the simplest case. The present invention is not limited to the above embodiment, and various changes and modifications may be made within the spirit and scope of the invention.

Figure 6:
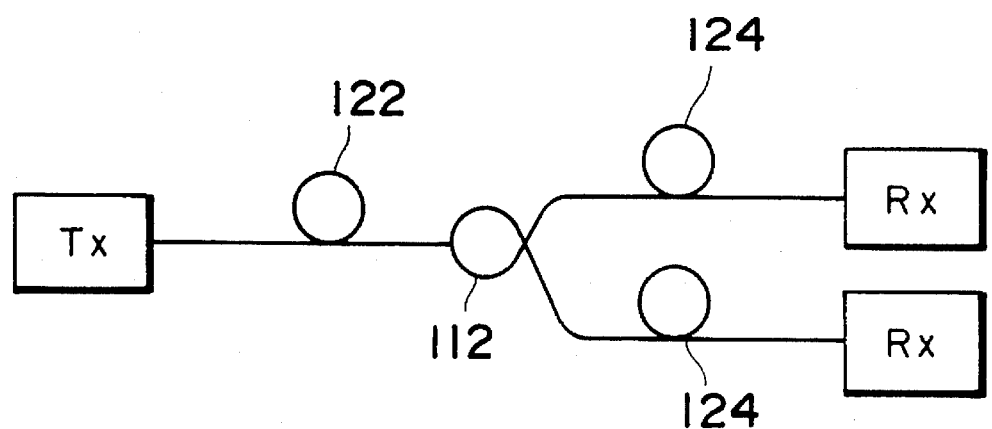
FIG. 6 is a view showing another arrangement.

For example, the present invention is applicable to a transmission system shown in FIG. 6, in which a plurality of receivers RX are connected to one transmitter TX, and an optical fiber 122 having a polarization mode dispersion τ(as the transmission media), a two-division coupler 112 having a polarization dependency A of an insertion loss (as the optical element), optical fibers 124 connected to the receivers RX constitute a transmission system. In this case, the two-division coupler 112 is arranged to satisfy condition (1) to prevent an increase in distortion factor in a relationship between the optical fiber 122 and the two-division coupler 112. In FIG. 6, the 1×2 coupler is used in the system. The 1×n coupler may be also applied to the system.

The present invention is also applicable to an arrangement constituted by a variety of optical elements, i.e., an optical transmission system (a combination of an optical isolator and an optical filter) in an optical fiber amplifier shown in FIG. 7. This optical amplifier comprises a 1.48-μm laser diode 710 as an excitation light source and its drive circuit 720. The optical amplifier has a temperature control circuit 712 for stably oscillating the laser diode 710, and a temperature alarm 714 for generating an alarm when the laser diode is heated to a temperature exceeding a predetermined operating temperature. The optical amplifier also includes an adjustment knob 722 for adjusting the drive current to the laser diode 710, a display unit 724 for displaying the drive current, and a drive current alarm for generating an alarm when the drive current exceeds a rated value. An optical isolator 136 for preventing return of an optical signal to the input side and an optical filter 142 for preventing leakage of excitation light to the output side are arranged in the transmission line. An Er-doped fiber 120 is used to amplify the optical signal with the excitation light (as the transmission media having polarization dispertion τ. A WDM coupler is used to guide the excitation light to the Er-doped fiber 120 (as the optical element).

The above arrangement is the same as that of a conventional optical amplifier. However, as in the above embodiment, the WDM coupler satisfies condition (1).

For example, if the optical isolator 136 or the Er-doped fiber 120 has a polarization mode dispersion, an accidental increase in distortion factor can be suppressed by applying condition (1), thereby enhancing the effect.

The present invention is further applicable to another modification in which the receiver RX has a polarization dependency of photoelectric conversion efficiency.

Figure 8:
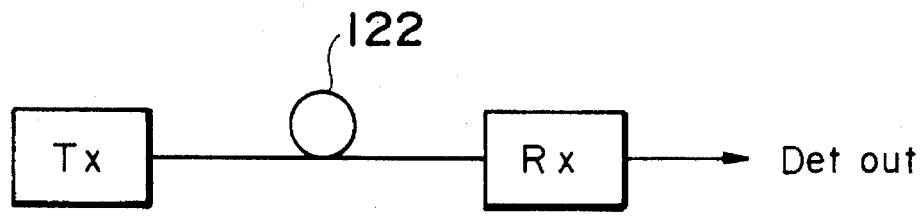
FIG. 8 is a view showing more another arrangement.

FIG. 8 illustrates the simplest arrangement of this modification. The optical transmitter TX, the transmission medium (optical fiber) 122, and the optical receiver RX are arranged as in conventional optical communication. If the conversion efficiency of a photoelectric conversion element (e.g., a PIN photodiode) of the receiver RX has a polarization dependency, the CSO is increased.

This point will be considered as follows. Assume that the optical element in FIG. 1 is regarded as a black box. The optical fibers 120 and 122 in FIGS. 1 and 8 are identical to each other and optical signals propagating the optical fibers are also identical to each other. Assume that the output signal of the optical signal 110 in FIG. 1 is replaced with an electrical signal output (det out) in FIG. 8. The optical element 110 in FIG. 1 corresponds to the receiver RX in FIG. 8. In FIG. 8, a conversion efficiency η of the photoelectric conversion element of the receiver RX corresponds to the transmittance T of the optical element in FIG. 1, and the polarization dependency B of the conversion efficiency η corresponds to the polarization dependency A of the insertion loss of the optical element 110.

Referring to FIG. 8, assume that the detected output (det out) of a predetermined current value (A) per unit power (W) of light having the center wavelength $\lambda_0$ is present, and that the corresponding conversion efficiency of the receiver is defined as $\eta_0$(A/W). In this case, the polarization dependency of the conversion efficiency can be determined using $\eta_0$ and the maximum value of the conversion efficiency as in FIG. 1 (see FIG. 3). Condition (1) can be rewritten as follows using these data:

$$20 \log_{10}\{(2\pi c/\lambda_1^2)\cdot n\cdot (B/\eta_0)\cdot \tau m\cdot \lambda_s] \leq C \qquad (14)$$

By using an optical receiver having $(B/\eta_0)$ satisfying condition (14), an optical communication apparatus which satisfies the required specifications (dB) of the distortion factor, i.e., −61 dB or more, can be arranged.

In this case, an accidental increase in distortion factor can be prevented to effectively arrange an optical communication apparatus.

As has been described above, according to the optical transmission line and the optical communication apparatus of the present invention, the $A/T_0$ value of the optical element (or the $B/\eta_0$ of the receiver) is measured in advance, and an optical element satisfying the predetermined relation is used to suppress an increase in distortion factor. The distortion factor which is equal to or smaller than the required distortion factor can be obtained. The distortion factor characteristics can be controlled to improve the transmission quality, thereby achieving good optical communication.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A method of forming an optical transmission line comprising a first transmission medium, a second transmission medium and a third transmission medium, for transmitting an optical analog signal, in which an optical signal is transmitted from said first optical medium to said second medium and is transmitted to said third transmission medium;

an optical signal input into said first transmission medium has a λ1 wavelength, a modulation index m per channel and a chirping amount λs for 100% modulation, and a number n of beats and;

an optical signal output from said optical second transmission medium has a predetermined composite second-order distortion C [dB], comprising the steps of:

selecting said second transmission medium having a characteristics satisfying the following equation:

$$20 \log_{10}\{(2\pi c/\lambda 1^2) \cdot n \cdot (A/T_0) \cdot \tau \cdot m \cdot \lambda s\} \leq C$$

(wherein said first transmission medium has polarization mode dispersion τ with respect to an inputted optical signal, a transmittance and a polarization dependency of an insertion loss of said second transmission medium optical signal are respectively $T_0$ and A, and c is the light velocity); and inserting said second transmission medium selected by said selecting step between said first and third transmission media.

2. A method according to claim 1, wherein said transmission media are arranged to include an optical fiber.

3. A method according to claim 1, wherein the composite second-order distortion C is about −61 [dB].

4. A method according to claim 1, wherein on said optical transmission line, a plurality of optical elements are arranged.

5. A method according to claim 1, wherein an optical element is arranged to include an optical fiber coupler.

6. A method according to claim 1, wherein said first transmission medium is arranged to include an optical fiber amplifier.

7. A method according to claim 1, wherein the coefficient for the number n of beats falls within a range of 10 to 20.

8. A method according to claim 1, wherein the coefficient for the number n of beats is about 11.

9. An optical transmission line for transmitting an optical analog signal comprising:

a first transmission medium having polarization mode dispersion τ with respect to said optical signal a second transmission medium connected to an outlet of said first transmission medium; and a third transmission medium connected to an output of said second transmission medium, for transmitting the optical signal output, wherein the optical signal in said second transmission medium has a predetermined composite second-order distortion C [dB], and a transmittance T0 of optical elements for said optical signal and a polarization dependency A of an insertion loss satisfy the following condition:

$$20 \log_{10}\{(2\pi c/\lambda 1^2) \cdot n \cdot (A/T_0) \cdot \tau \cdot m \cdot \lambda s\} \leq C$$

(where λ1 is a wavelength of said optical signal, m is a modulation index per channel of said optical signal at said first transmission medium, λs is a chirping amount for 100% modulation of said optical signal at said first transmission medium n is a number of beats occurring in the optical signal and c is the light velocity).

10. A line according to claim 9, wherein said first and second transmission media are arranged to include an optical fiber.

11. A line according to claim 9, wherein the composite second-order distortion C is about −61 [dB].

12. A line according to claim 9, wherein on said optical transmission line, a plurality of optical elements are arranged.

13. A line according to claim 9, wherein an optical element is arranged to include an optical fiber coupler.

14. A line according to claim 9, wherein said first transmission medium is arranged to include an optical fiber amplifier.

15. A line according to claim 9, wherein the coefficient for the number n of beats falls within a range of 10 to 20.

16. A line according to claim 9, wherein the coefficient for the number n of beats is about 11.

17. An optical communication apparatus for propagating an optical analog signal, comprising:

transmission medium having a polarization mode dispersion τ for said optical signal, and a receiver connected to an outlet of said transmission medium for receiving and converting said optical signal to an electrical signal, wherein said electrical signal from said optical receiver has a predetermined composite second-order distortion C [dB], and, said optical receiver comprises an optical receiver defined such that a conversion efficiency η0 of said optical receiver for the light having the wavelength λ1 and a polarization dependency B of the conversion efficiency η0 satisfy the following condition:

$$20 \log_{10}\{(2\pi c/\lambda 1^2) \cdot n \cdot (B/\eta_0) \tau \cdot m \cdot \lambda s\} \leq C$$

(where λ1 is a wavelength of said optical signal, m is a modulation index per channel of said optical signal, λs is a chirping amount for 100% modulation of said optical signal, n is a number of beats occurring in the optical signal and c is the light velocity).

* * * * *